US011127193B2

(12) United States Patent
Segal et al.

(10) Patent No.: US 11,127,193 B2
(45) Date of Patent: Sep. 21, 2021

(54) SYSTEM AND METHOD FOR DETERMINING AN APPROXIMATE TRANSFORMATION BETWEEN COORDINATE SYSTEMS (71) Applicant: RESIGHT LTD., Beersheba (IL)

(72) Inventors: Eran Segal, Tel Aviv-Jaffa (IL); Ari Zigler, Tel Aviv-Jaffa (IL); Omri Yaakov Stein, Tel Aviv-Jaffa (IL)

(73) Assignee: RESIGHT LTD., Beersheba (IL)

( * ) Notice: Subject to any disclaimer, the term of this patent is extended or adjusted under 35 U.S.C. 154(b) by 0 days.

(21) Appl. No.: 17/053,836

(22) PCT Filed: May 7, 2019

(86) PCT No.: PCT/IL2019/050520
§ 371 (c)(1),
(2) Date: Nov. 9, 2020

(87) PCT Pub. No.: WO2019/215738
PCT Pub. Date: Nov. 14, 2019

(65) Prior Publication Data
US 2021/0241517 A1 Aug. 5, 2021

Related U.S. Application Data (60) Provisional application No. 62/670,003, filed on May 11, 2018.

(51) Int. Cl.
*G06T 15/10* (2011.01)
*G06T 7/70* (2017.01)
(52) U.S. Cl.
CPC .............. *G06T 15/10* (2013.01); *G06T 7/70* (2017.01); *G06T 2207/10016* (2013.01)

(58) Field of Classification Search
CPC .............................. G06T 19/006; G06T 15/10
See application file for complete search history.

(56) References Cited

U.S. PATENT DOCUMENTS 8,839,121 B2    9/2014   Bertolami et al.
9,619,942 B2    4/2017   Finn et al.
(Continued)

OTHER PUBLICATIONS

Liu, B., Zhang, F., Qu, X. and Shi, X., 2016. A rapid coordinate transformation method applied in industrial robot calibration based on characteristic line coincidence. Sensors, 16(2), p. 239.

*Primary Examiner* — Phi Hoang (57) ABSTRACT

A system for determining an approximate transformation between a first coordinate system and a second coordinate system, the system comprising a processing resource configured to: obtain an image captured by an image acquisition device of a mobile device; identify one or more synchronization objects within the image; determine first spatial dispositions of the synchronization objects with respect to a first coordinate-system origin of the first coordinate-system, the first coordinate system being a coordinate system of the mobile device; obtain information of second spatial dispositions of the synchronization objects with respect to a second coordinate-system origin of the second coordinate system; and determine, by employing an optimization scheme, utilizing the first spatial dispositions and the second spatial dispositions, the approximate transformation between the first coordinate-system and the second coordinate-system, the approximate transformation being usable by the mobile device for placing virtual objects with respect to the second coordinate-system.

20 Claims, 3 Drawing Sheets

(56) References Cited

U.S. PATENT DOCUMENTS

| | | |
|---|---|---|
| 9,754,397 B1 | 9/2017 | Piemonte et al. |
| 2005/0256395 A1* | 11/2005 | Anabuki ................. G06T 7/246 |
| | | 600/414 |
| 2010/0287485 A1 | 11/2010 | Bertolami et al. |
| 2013/0194304 A1 | 8/2013 | Latta et al. |
| 2013/0265330 A1* | 10/2013 | Goto .................. G02B 27/0172 |
| | | 345/632 |
| 2013/0331664 A1 | 12/2013 | Gilad-Gilor |
| 2014/0085330 A1* | 3/2014 | Sugita ..................... G06F 3/017 |
| | | 345/629 |
| 2015/0057082 A1 | 2/2015 | Kareemi et al. |
| 2015/0356789 A1* | 12/2015 | Komatsu ................... G06T 7/74 |
| | | 345/633 |
| 2016/0026253 A1 | 1/2016 | Bradski et al. |
| 2017/0046878 A1 | 2/2017 | Dobslaw |
| 2018/0005450 A1 | 1/2018 | Daniels et al. |
| 2018/0185100 A1* | 7/2018 | Weinstein .............. A61B 34/20 |
| 2018/0258569 A1* | 9/2018 | Kamihira ................ D05B 19/12 |
| 2019/0160662 A1* | 5/2019 | Satou ..................... B25J 9/1664 |
| 2019/0228263 A1* | 7/2019 | Szeto ................ G06K 9/00671 |

* cited by examiner

SYSTEM AND METHOD FOR DETERMINING AN APPROXIMATE TRANSFORMATION BETWEEN COORDINATE SYSTEMS

TECHNICAL FIELD

The invention relates to a system and method for determining an approximate transformation between coordinate systems.

BACKGROUND

Many devices (including mobile devices, such as mobile phones, laptops, tablets, smart watches, or any other mobile device having data processing capabilities) and/or applications operating on such devices, utilize a device-specific coordinate system (also referred to herein as "local coordinate system"), having a certain coordinate system origin. Therefore, a first device/application may operate using a first coordinate system, having a first coordinate system origin, a second device may operate using a second coordinate system, having a second coordinate system origin other than the first coordinate system origin, and so on and so forth. For various purposes, it is desirable to have the ability to determine a transformation between a first local coordinate system of a first device, and a second local coordinate system of a second device.

One exemplary need exists in augmented reality applications, where it is desirable to place virtual objects (being Computer-Generated (CG) data) in various locations within a given real-world space viewable by a plurality of devices (including mobile devices that are not fixed in space). In such cases, it is desirable to have the virtual objects appear to be placed in a fixed position in the given real-world space, irrespective of the local coordinate system of the devices that are viewing them.

Looking at a specific example, a given virtual object can be placed by a user of a first device in a certain real-world space associated with certain coordinates (e.g. X1, Y1, Z1) within a first coordinate system used by the first device having a first coordinate system origin. If an attempt is made to display the given virtual object on the same coordinates (X1, Y1, Z1) on another device, that operates using a second coordinate system, the given virtual object will appear to be placed at another real-world space, as the second coordinate system has a second coordinate system origin.

Therefore, there is a need for a new system and method for determining an approximate transformation between coordinate systems.

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 8,839,121 (Bertolami et al.) published on Sep. 16, 2014, discloses Systems and methods for unifying coordinate systems in an augmented reality application or system are disclosed. User devices capture an image of a scene, and determine a location based on the scene image. The scene image may be compared to cartography data or images to determine the location. User devices may propose an origin and orientation or transformation data for a common coordinate system and exchange proposed coordinate system data to agree on a common coordinate system. User devices may also transmit location information to an augmented reality system that then determines a common coordinate system and transmits coordinate system data such as transformation matrices to the user devices. Images presented to users may be adjusted based on user device locations relative to the coordinate system.

US Patent Application No. 2013/0194304 (Letta et al.) published on Aug. 1, 2013, discloses a method for presenting real and virtual images correctly positioned with respect to each other. The method includes, in a first field of view, receiving a first real image of an object and displaying a first virtual image. The method also includes, in a second field of view oriented independently relative to the first field of view, receiving a second real image of the object and displaying a second virtual image, the first and second virtual images positioned coincidently within a coordinate system.

US Patent Application No. 2018/0005450 (Daniels et al.) published on Jan. 4, 2018, discloses a system for accurately positioning augmented reality (AR) content within a coordinate system such as the World Geodetic System (WGS) may include AR content tethered to trackable physical features. As the system is used by mobile computing devices, each mobile device may calculate and compare relative positioning data between the trackable features. The system may connect and group the trackable features hierarchically, as measurements are obtained. As additional measurements are made of the trackable features in a group, the relative position data may be improved, e.g., using statistical methods.

U.S. Pat. No. 9,619,942 (Finn et al.) published on Apr. 11, 2017, discloses a method, a system, and a mobile device that incorporate augmented reality technology into land surveying, 3D laser scanning, and digital modeling processes. By incorporating the augmented reality technology, the mobile device can display an augmented reality image comprising a real view of a physical structure in the real environment and a 3D digital model of an unbuilt design element overlaid on top of the physical structure at its intended tie-in location. In an embodiment, a marker can be placed at predetermined set of coordinates at or around the tie-in location, determined by surveying equipment, so that the 3D digital model of the unbuilt design element can be visualized in a geometrically correct orientation with respect to the physical structure. Embodiments of the present invention can also be applied to a scaled down 3D printed object representing the physical structure if visiting the project site is not possible.

US Patent Application No. 2016/0026253 (Bradski et al.) published on Jan. 28, 2016, discloses configurations for presenting virtual reality and augmented reality experiences to users. The system may comprise an image capturing device to capture one or more images, the one or more images corresponding to a field of the view of a user of a head-mounted augmented reality device, and a processor communicatively coupled to the image capturing device to extract a set of map points from the set of images, to identify a set of sparse points and a set of dense points from the extracted set of map points, and to perform a normalization on the set of map points.

U.S. Pat. No. 9,754,397 (Piemonte et al.) published on Sep. 5, 2017, discloses methods, hardware, and software perform augmented reality created from a separate source in context with, such as synchronized and positioned in, captured media, so as to replicate a similar augmented reality at a different instance. A computer processor in a network of communications devices handles a combination of augmented reality information, anchor information that provides the context-matching, limitation information that controls if such information is transmitted or acted upon, and captured media information. The computer processor compares the anchor information with the media to identify triggering media and how augmented reality elements should appear in context with such media. If successful, the augmented reality is performed on a communications device based on the media. Augmented reality can thus be performed in strict reference to actually-captured media, in only desired or restricted conditions, and information transmission and processing to enable the same may be undertaken only at useful, resource-conserving instances.

US Patent Application No. 2017/0046878 (Dobslaw) published on Feb. 16, 2017, discloses a mobile device computationally locates a three-dimensional virtual object model at a first virtual location corresponding to a first geographical location; computationally orients the three-dimensional virtual object model at a first virtual orientation; determines a real location and real orientation of the mobile device over time; captures real world image data over time; and displays over time an augmented reality view including the real world image data and the three-dimensional virtual object model in the first virtual location and first virtual orientation from a correct perspective of the mobile device based on the determined real location and real orientation of the mobile device. The correct perspective varies as the mobile device is relocated and reoriented over time by movement.

General Description

In accordance with a first aspect of the presently disclosed subject matter, there is provided a system for determining an approximate transformation between a first coordinate system and a second coordinate system, the system comprising a processing resource configured to: obtain an image captured by an image acquisition device of a mobile device; identify, by analyzing the image, one or more synchronization objects within the image; determine first spatial dispositions of the synchronization objects with respect to a first coordinate-system origin of the first coordinate-system, the first coordinate system being a coordinate system of the mobile device; obtain information of second spatial dispositions of the synchronization objects with respect to a second coordinate-system origin of the second coordinate system; and determine, by employing an optimization scheme, utilizing the first spatial dispositions and the second spatial dispositions, the approximate transformation between the first coordinate-system and the second coordinate-system, the approximate transformation being usable by the mobile device for placing virtual objects with respect to the second coordinate-system.

In some cases, the processing resource is further configured to: obtain, over time, a sequence of subsequent images, captured subsequently to the image; for each subsequent image of the sequence: identify, by analyzing the subsequent image, one or more subsequent synchronization objects within the subsequent image; determine, by analyzing the subsequent image, third spatial dispositions of the synchronization objects with respect to the first coordinate-system origin; obtain information of fourth spatial dispositions of the subsequent synchronization objects with respect to the second coordinate-system origin; and determine an optimized approximate transformation, by employing the optimization scheme utilizing the third spatial dispositions and the fourth spatial dispositions.

In some cases, the optimized approximate transformation is determined by employing the optimization scheme utilizing also the approximate transformation.

In some cases, the optimized approximate transformation is determined by employing the optimization scheme utilizing also the first spatial dispositions and the second spatial dispositions.

In some cases, at least one of the subsequent synchronization objects corresponds to at least one of the synchronization objects.

In some cases, the optimized approximate transformation is determined by employing the optimization scheme utilizing the third spatial dispositions determined for all of the subsequent images within the sequence of subsequent images and the fourth spatial dispositions obtained for all of the subsequent images within the sequence of subsequent images.

In some cases, the optimized approximate transformation is determined by employing the optimization scheme utilizing the third spatial dispositions determined for a subset of the subsequent images within the sequence of subsequent images and the fourth spatial dispositions obtained for the subset of the subsequent images within the sequence of subsequent images.

In some cases, the subset includes the subsequent images acquired during a given time window.

In some cases, the given time window is a sliding time window.

In some cases, the subset includes the subsequent images acquired in a given geographical location.

In some cases, the given geographical location dynamically changes in accordance with a geographical location of the mobile device.

In some cases, the optimization scheme is based on one or more of the following: (a) Non-linear regression; (b) Non-linear Least Squares Optimization; (c) Non-linear programming; (d) Bayesian estimation; and (e) Linear quadratic estimation. In some cases, at least one of the synchronization objects is a uniquely identified object.

In some cases, the uniquely identified object is identified using a Quick Response (QR) code.

In some cases, the uniquely identified object is a predetermined marker.

In some cases, the uniquely identified object is a dynamically created marker.

In some cases, the dynamically created marker is shared between other mobile devices.

In some cases, the uniquely identified object is a semantically labeled object.

In some cases, the uniquely identified object is a light emitting object.

In some cases, the uniquely identified object is another mobile device.

In some cases, the uniquely identified object is a biometrically identified person, identified using face recognition.

In some cases, the processing resource is further configured to obtain one or more parameters relating to one or more of the synchronization objects, and wherein the synchronization objects are identified using the corresponding parameters.

In some cases, the parameters include one or more of the following: (a) an orientation of the corresponding synchronization object; (b) a pose of the corresponding synchronization object; (c) a scale or size of the corresponding synchronization object; (d) a semantic label of the corresponding synchronization object; (e) a shape of the corresponding synchronization object; (f) a texture sample of the corresponding synchronization object; and (g) a statistical description of the corresponding synchronization object's one or more parameters.

In some cases, at least one given synchronization object of the synchronization objects is a person identified using face detection and by obtaining information of a first angle of the given synchronization object with respect to north and a second angle of the mobile device with respect to north.

In some cases, the sum of the first angle and the second angle is between 160° and 200°.

In some cases, the sum of the first angle and the second angle is 180°.

In some cases, the first spatial dispositions are determined using information of the direction of the mobile device with respect to the ground and north.

In some cases, at least one of the synchronization objects is a person and wherein the first spatial disposition is determined also using a calculated distance between pupils of the person in the image and a predetermined reference distance.

In some cases, the reference distance is one of the following: (a) an average distance between human pupils; (b) an average distance between female human pupils when the person is a female; (c) an average distance between male human pupils when the person is a male; (d) an average distance between pupils of humans of a certain age group when the person is identified as being within the certain age group; and (e) a distance between the pupils of the person.

In some cases, the second coordinate system is a coordinate system of a second mobile device, other than the mobile device.

In accordance with a second aspect of the presently disclosed subject matter, there is provided a method for determining an approximate transformation between a first coordinate system and a second coordinate system, the method comprising: obtaining, by a processing resource, an image captured by an image acquisition device of a mobile device; identifying, by the processing resource and by analyzing the image, one or more synchronization objects within the image; determining, by the processing resource, first spatial dispositions of the synchronization objects with respect to a first coordinate-system origin of the first coordinate-system, the first coordinate system being a coordinate system of the mobile device; obtaining, by the processing resource, information of second spatial dispositions of the synchronization objects with respect to a second coordinate-system origin of the second coordinate system; and determining, by the processing resource and by employing an optimization scheme, utilizing the first spatial dispositions and the second spatial dispositions, the approximate transformation between the first coordinate-system and the second coordinate-system, the approximate transformation being usable by the mobile device for placing virtual objects with respect to the second coordinate-system.

In some cases, the method further comprises: obtaining, by the processing resource, over time, a sequence of subsequent images, captured subsequently to the image; for each subsequent image of the sequence: identifying, by the processing resource and by analyzing the subsequent image, one or more subsequent synchronization objects within the subsequent image; determining, by the processing resource and by analyzing the subsequent image, third spatial dispositions of the synchronization objects with respect to the first coordinate-system origin; obtaining, by the processing resource, information of fourth spatial dispositions of the subsequent synchronization objects with respect to the second coordinate-system origin; and determining, by the processing resource, an optimized approximate transformation, by employing the optimization scheme utilizing the third spatial dispositions and the fourth spatial dispositions.

In some cases, the optimized approximate transformation is determined by employing the optimization scheme utilizing also the approximate transformation.

In some cases, the optimized approximate transformation is determined by employing the optimization scheme utilizing also the first spatial dispositions and the second spatial dispositions.

In some cases, at least one of the subsequent synchronization objects corresponds to at least one of the synchronization objects.

In some cases, the optimized approximate transformation is determined by employing the optimization scheme utilizing the third spatial dispositions determined for all of the subsequent images within the sequence of subsequent images and the fourth spatial dispositions obtained for all of the subsequent images within the sequence of subsequent images.

In some cases, the optimized approximate transformation is determined by employing the optimization scheme utilizing the third spatial dispositions determined for a subset of the subsequent images within the sequence of subsequent images and the fourth spatial dispositions obtained for the subset of the subsequent images within the sequence of subsequent images.

In some cases, the subset includes the subsequent images acquired during a given time window.

In some cases, the given time window is a sliding time window.

In some cases, the subset includes the subsequent images acquired in a given geographical location.

In some cases, the given geographical location dynamically changes in accordance with a geographical location of the mobile device.

In some cases, the optimization scheme is based on one or more of the following: (a) Non-linear regression; (b) Non-linear Least Squares Optimization; (c) Non-linear programming; (d) Bayesian estimation; and (e) Linear quadratic estimation In some cases, at least one of the synchronization objects is a uniquely identified object.

In some cases, the uniquely identified object is identified using a Quick Response (QR) code.

In some cases, the uniquely identified object is a predetermined marker.

In some cases, the uniquely identified object is a dynamically created marker.

In some cases, the dynamically created marker is shared between other mobile devices.

In some cases, the uniquely identified object is a semantically labeled object.

In some cases, the uniquely identified object is a light emitting object.

In some cases, the uniquely identified object is another mobile device.

In some cases, the uniquely identified object is a biometrically identified person, identified using face recognition.

In some cases, the method further comprises obtaining, by the processing resource, one or more parameters relating to one or more of the synchronization objects, and wherein the synchronization objects are identified using the corresponding parameters.

In some cases, the parameters include one or more of the following: (a) an orientation of the corresponding synchronization object; (b) a pose of the corresponding synchronization object; (c) a scale or size of the corresponding synchronization object; (d) a semantic label of the corresponding synchronization object; (e) a shape of the corresponding synchronization object; (f) a texture sample of the corresponding synchronization object; and (g) a statistical description of the corresponding synchronization object's one or more parameters.

In some cases, at least one given synchronization object of the synchronization objects is a person identified using face detection and by obtaining information of a first angle of the given synchronization object with respect to north and a second angle of the mobile device with respect to north.

In some cases, the sum of the first angle and the second angle is between 160° and 200°.

In some cases, the sum of the first angle and the second angle is 180°.

In some cases, the first spatial dispositions are determined using information of the direction of the mobile device with respect to the ground and north.

In some cases, at least one of the synchronization objects is a person and wherein the first spatial disposition is determined also using a calculated distance between pupils of the person in the image and a predetermined reference distance.

In some cases, the reference distance is one of the following: (a) an average distance between human pupils; (b) an average distance between female human pupils when the person is a female; (c) an average distance between male human pupils when the person is a male; (d) an average distance between pupils of humans of a certain age group when the person is identified as being within the certain age group; and (e) a distance between the pupils of the person.

In some cases, the second coordinate system is a coordinate system of a second mobile device, other than the mobile device.

In accordance with a third aspect of the presently disclosed subject matter, there is provided a non-transitory computer readable storage medium having computer readable program code embodied therewith, the computer readable program code, executable by at least one processor of a computer to perform a method for determining an approximate transformation between a first coordinate system and a second coordinate system, the method comprising: obtaining, by the processor, an image captured by an image acquisition device of a mobile device; identifying, by the processor and by analyzing the image, one or more synchronization objects within the image; determining, by the processor, first spatial dispositions of the synchronization objects with respect to a first coordinate-system origin of the first coordinate-system, the first coordinate system being a coordinate system of the mobile device; obtaining, by the processor, information of second spatial dispositions of the synchronization objects with respect to a second coordinate-system origin of the second coordinate system; and determining, by the processor and by employing an optimization scheme, utilizing the first spatial dispositions and the second spatial dispositions, the approximate transformation between the first coordinate-system and the second coordinate-system, the approximate transformation being usable by the mobile device for placing virtual objects with respect to the second coordinate-system.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "identifying", "determining", or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
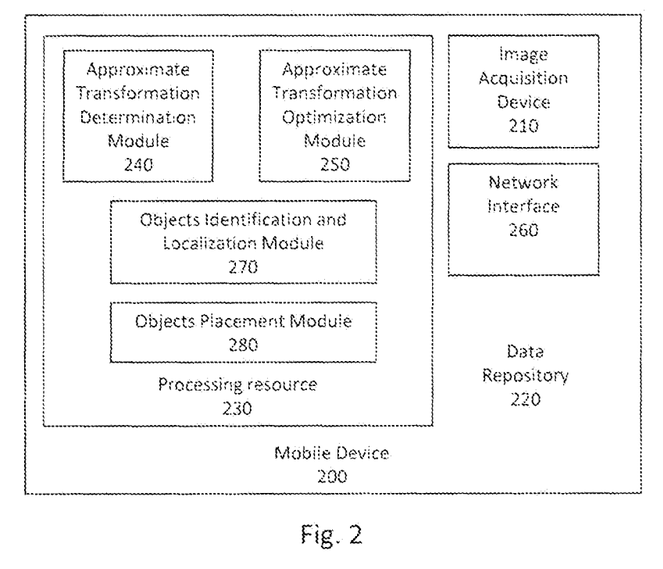
FIG. 2 is a block diagram schematically illustrating one example of a device capable of determining an approximate transformation between its coordinate system and a different coordinate system of another device, in accordance with the presently disclosed subject matter.
Figure 3:
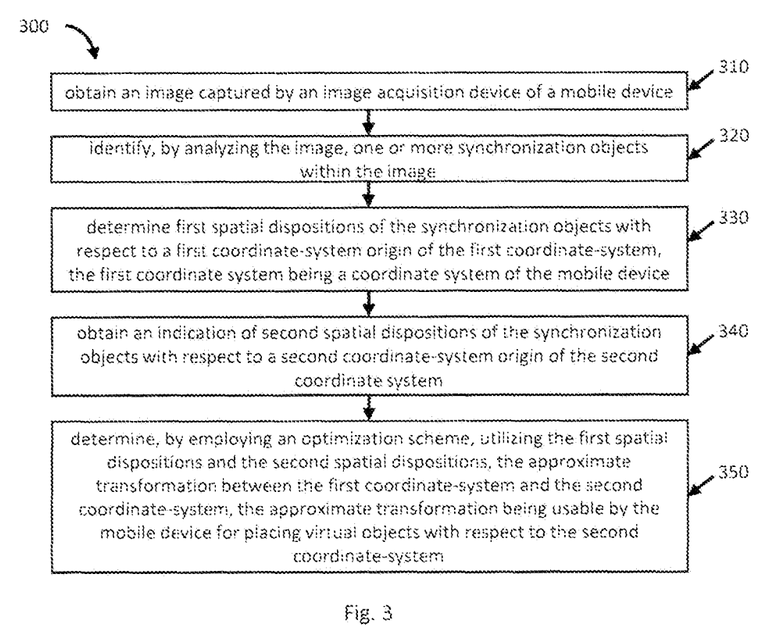
FIG. 3 is a flowchart illustrating one example of a sequence of operations carried out for determining an approximate transformation between a coordinate system of a device and a different coordinate system of another device, in accordance with the presently disclosed subject matter.
Figure 4:
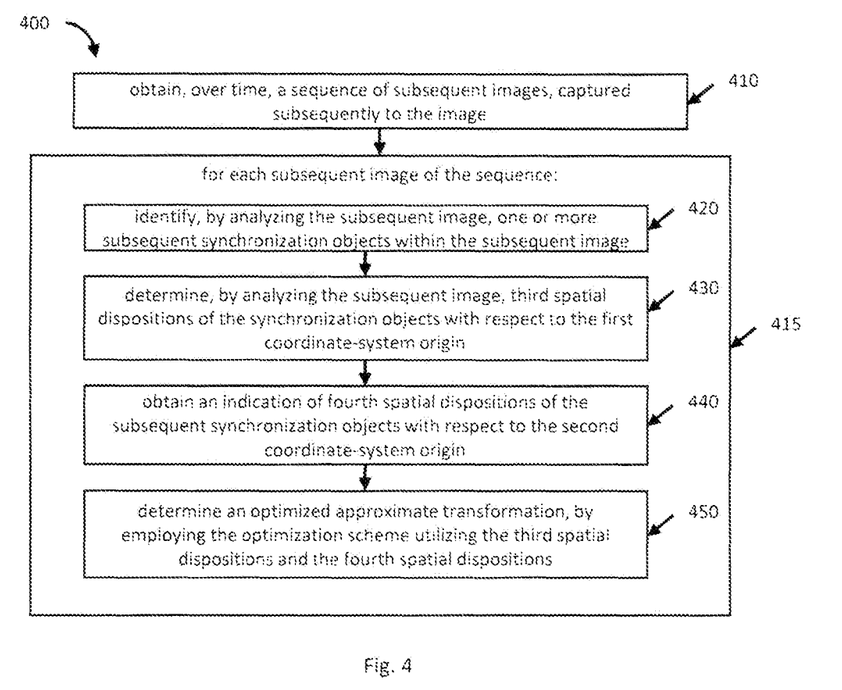
FIG. 4 is a flowchart illustrating one example of a sequence of operations carried out for optimizing, over time, an approximate transformation between a coordinate system of a device and a different coordinate system of another device, in accordance with the presently disclosed subject matter.
Figure 5:
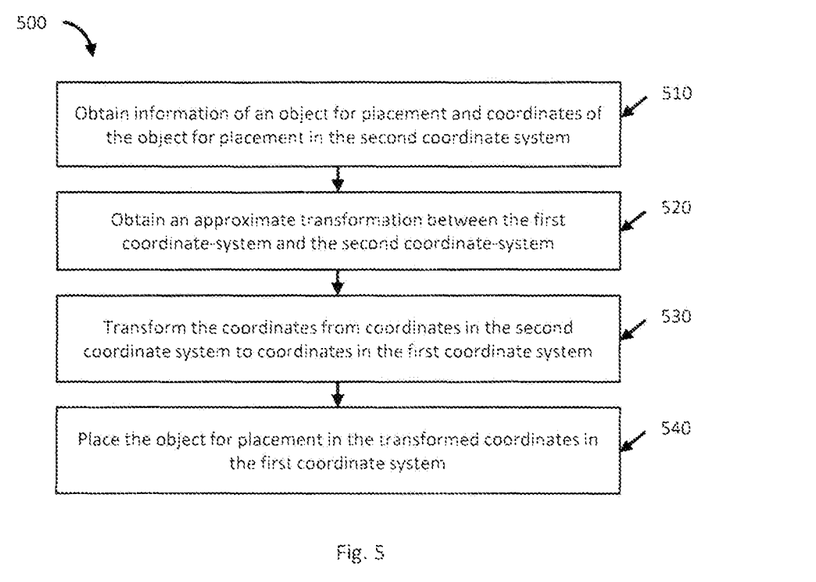
FIG. 5 is a flowchart illustrating one example of a sequence of operations carried out for placing an object having coordinates in a first coordinate system on corresponding coordinates in a second coordinate system, in accordance with the presently disclosed subject matter.

In embodiments of the presently disclosed subject matter, fewer, more and/or different stages than those shown in FIGS. 3-5 may be executed. In embodiments of the presently disclosed subject matter one or more stages illustrated in FIGS. 3-5 may be executed in a different order and/or one or more groups of stages may be executed simultaneously. FIG. 2 illustrates a general schematic of the system architecture in accordance with an embodiment of the presently disclosed subject matter. Each module in FIG. 2 can be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIG. 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Figure 1:
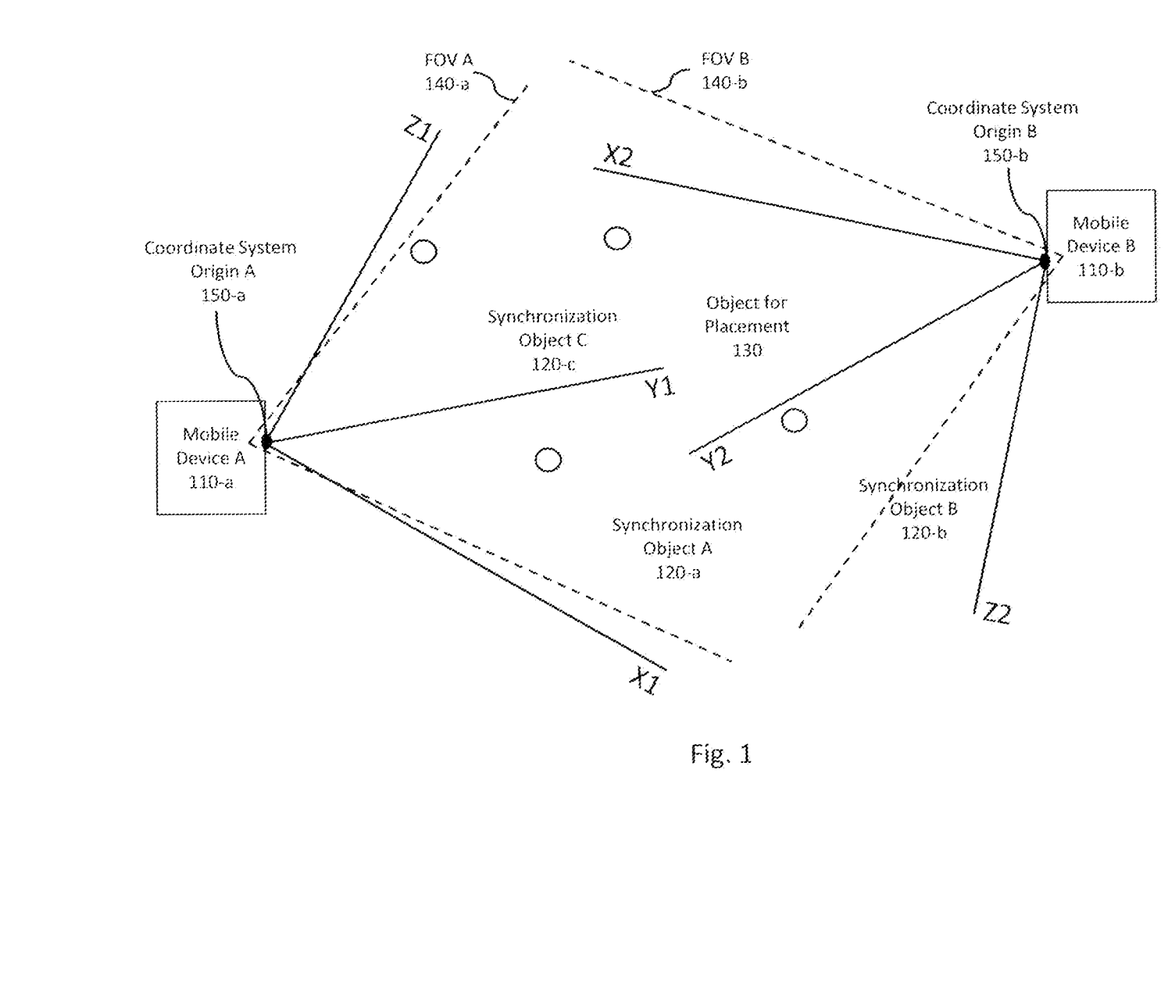
FIG. 1 is a schematic illustration of different local coordinate systems of different devices along with objects used for determining an approximate transformation between the different local coordinate systems, and an object for placement within a scene viewable by image acquisition devices of the different mobile devices, in accordance with the presently disclosed subject matter.

Bearing this in mind, attention is drawn to FIG. 1, a schematic illustration of different local coordinate systems of different devices along with objects used for determining an approximate transformation between the different local coordinate systems, and an object for placement within a scene viewable by image acquisition devices of the different mobile devices, in accordance with the presently disclosed subject matter.

In the illustration, two devices are shown—mobile device A 110-a and mobile device B 110-b. Mobile device A 110-a and mobile device B 110-b can be, for example, mobile phones, laptops, tablets, smart watches, augmented reality glasses (such as google glass, Oculus, HoloLens, and others) or any other mobile device having data processing capabilities and the ability to physically move in space.

It is to be noted that although mobile device A 110-a and mobile device B 110-b are both mobile devices that can be physically moved in space, in some cases, at least one of the devices in accordance with the presently disclosed subject matter can be stationary (i.e. have a fixed location in space), and in some cases, both can be stationary, mutatis mutandis. Some exemplary such stationary devices include desktop computers, smart television sets, game consoles, etc.

Each of the mobile devices, mobile device A 110-a and mobile device B 110-b (together referred to herein as "Mobile Devices"), has its own local coordinate system. mobile device A's 110-a local coordinate system is represented in the illustration by lines X1, Y1 and Z1, whereas mobile device B's 110-b local coordinate system is represented in the illustration by lines X2, Y2 and Z2. Each local coordinate system has its own local coordinate system origin, namely coordinate system origin A 150-a (where X1, Y1 and Z1 intersect) and coordinate system origin B 150-b (where X2, Y2 and Z2 intersect), respectively.

It is to be noted that when reference is made to coordinate system, it can refer to a coordinate with three degrees of freedom (e.g. x, y, z), or to a coordinate system with more than three degrees of freedom (also including at least one of pitch, roll, yaw and optionally a metric scale). In some cases, at least some of the degrees of freedom can be solved/reduced using knowledge of the mobile devices angle with respect to north, and the direction of gravity.

Coordinate system origin A 150-a and coordinate system origin B 150-b are different than each other, i.e. they are not located at the same physical location, so that assuming that a global coordinate system is provided, the coordinate (0,0,0) in the local coordinate system of mobile device A 110-a translates to a first coordinate on the global coordinate system, and the coordinate (0,0,0) in the local coordinate system of mobile device B 110-b translates to a second coordinate on the global coordinate system, where the first coordinate and the second coordinate on the global coordinate system are not identical.

As indicated herein, it is desirable to enable determination of an approximate transformation between the coordinate systems of the Mobile Devices. Such transformation can be determined using information of a spatial disposition of one or more synchronization objects with respect to coordinate system origin A 150-a and with respect to coordinate system origin B 150-b. The synchronization objects are identifiable objects within the Field-of-View (FOV) of an image acquisition device (e.g. a camera that can capture images and/or a video stream comprised of a plurality of images, or any other sensor that can generate an image, or a mapping, of a scenery, including LIDAR, radar, range scanner, sonar, beacon, etc.) of each of the Mobile Devices (namely FOV A 140-a of mobile device A 110-a and FOV B 140-b of mobile device B 110-b).

In the non-limiting illustrated example, three synchronization objects are shown: synchronization object A 120-a, synchronization object B 120-b, and synchronization object C 120-c. Each of the synchronization objects has a first coordinate in mobile device A's 110-a local coordinate system (represented in the illustration by lines X1, Y1 and Z1), and a second coordinate in mobile device B's 110-a local coordinate system (represented in the illustration by lines X2, Y2 and Z2). It is to be noted that the first coordinate can be estimated by mobile device A 110-a, and the second coordinate can be estimated by mobile device B 110-*b*, e.g. using various known methods and/or techniques, or using proprietary algorithms. Some exemplary such methods and/or techniques include comparing a known size of the synchronization object with its size on the image plane of the image acquired by the image acquisition device. In other cases, where the size of the synchronization object is unknown, it can be estimated utilizing knowledge of similar objects (i.e. if the synchronization object is a glass, its size can be estimated using knowledge of sizes of glasses, etc.). Another alternative is to use triangulation of interest points (also referred to as image features) by tracking the points over time or over subsequent images (e.g. by matching similar points to previously seen points, or by an optical flow algorithm). As another alternative, Simultaneous Localization and Mapping (SLAM) methods may be used. As a further alternative, disparity maps between two images may be used.

Any of the Mobile Devices that obtains the information of the spatial disposition of the synchronization object with respect to the other mobile device's coordinate system origin, can use such information to determine, an approximate transformation between the coordinate systems of the Mobile Devices. The approximate transformation can be determined using an optimization scheme such as: non-linear regression, non-linear least squares optimization, non-linear programming, Bayesian estimation, linear quadratic estimation, etc. The optimization scheme can obtain, as inputs, the coordinates of the synchronization objects in the local coordinate system of mobile device A 110-*a*, and in the local coordinate system of mobile device B 110-*b*. The optimization scheme can attempt to identify, using the coordinates of the synchronization objects in both coordinate systems, an optimal transformation between the coordinate systems, optionally given one or more constraints (e.g. calculation time, number of iterations, etc.), as further detailed herein, inter alia with reference to FIGS. 3 and 4.

A simple example, provided for ease of understanding, is as follows: O1 and O2 are the origins of coordinate systems of two devices. sA, sB, sC are three synchronization objects having the following coordinates in the coordinate systems having an origin at O1 and at O2:

sA=(1,0,1) in O1; (9,0,9) in O2
sB=(8,0,2) in O1; (2,0,8) in O2
sC=(4,0,6) in O1; (6,0,4) in O2

After calculation, the device having a coordinate system having an origin at O2 estimates the transformation of its own coordinate system to the coordinate system of the other device having an origin at O1 to be:

R=(0, pi, 0) {i.e. pi degrees in they axis, R stands for "Rotation" in radians}
C=(10, 0, 10) {i.e. 10 meters in X axis and 10 meters in Z axis of the first coordinate system, C stands for "Center" in meters}

In light of the fact that the transformation is determined using estimations of the coordinates of the synchronization objects in each of the coordinate systems, the transformation is an estimated transformation, that may have errors. Therefore, in some cases, the transformation is optimized over time, as more and more information is provided about the estimated coordinates of the synchronization objects (and optionally of newly identified synchronization objects). A further explanation is provided herein, inter alia with reference to FIG. 4.

Once an estimated transformation is determined, it can be used for placement of objects in a synchronized manner on a display of the Mobile Devices. Assuming that an object for placement 130, is placed by mobile device A 110-*a*, at a given coordinate in its local coordinate system—the transformation can be used to determine the corresponding coordinates for the object for placement 130 in the local coordinates of mobile device B 110-*b*, so that the object for placement 130 will appear to be in the same real-world location by both Mobile Devices, up to a certain degree of accuracy that depends on the accuracy of the transformation.

Turning to FIG. 2, there is shown a block diagram schematically illustrating one example of a device capable of determining an approximate transformation between its coordinate system and a different coordinate system of another device, in accordance with the presently disclosed subject matter.

It is to be noted that although in the foregoing explanation, reference is made to a mobile device 200, the device does not have to be a mobile device, and it can also be stationary, mutatis mutandis. According to certain examples of the presently disclosed subject matter, mobile device 200 can comprise a network interface 260 enabling sending/receiving data, including receiving information from other devices (whether mobile or not), such as locations of synchronization objects in the other device's local coordinate system, metadata/parameters associated with the synchronization objects, etc.

Mobile device 200 can further comprise, or be otherwise associated with, a data repository 220 (e.g. a database, a storage system, a memory including Read Only Memory—ROM, Random Access Memory—RAM, or any other type of memory, etc.) configured to store data, including inter alia one or more approximate transformation between the local coordinate of the mobile device 200 and respective local coordinate systems of other devices, information of previously determined locations of synchronization objects in the mobile device's 200 local coordinate system and/or in other device's local coordinate systems, etc. Data repository 220 can be further configured to enable retrieval and/or update and/or deletion of the stored data. It is to be noted that in some cases, data repository 220 can be distributed, while the mobile device 200 has access to the information stored thereon, e.g. via a network to which it connects through the network interface 260.

Mobile device 200 further comprises at least one image acquisition device 210. Image acquisition device 210 can be any camera capable of acquiring images and/or videos, or any other sensor that can generate an image, or a mapping, of a scenery, including LIDAR, radar, range scanner, sonar, beacon, etc.

Mobile device 200 further comprises one or more processing resources 230. Processing resource 230 can be one or more processing units (e.g. central processing units), microprocessors, microcontrollers or any other computing devices or modules, including multiple and/or parallel and/or distributed processing units, which are adapted to independently or cooperatively process data for controlling relevant resources of the mobile device 200 and for enabling operations related to resources of the mobile device 200.

The processing resource 230 can comprise one or more of the following modules: approximate transformation determination module 240, approximate transformation optimization module 250, and objects identification and localization module 270.

According to some examples of the presently disclosed subject matter, approximate transformation determination module 240 can be configured to perform an approximate transformation determination process, as further detailed herein, inter alia with respect to FIG. 3. Approximate transformation optimization module 240 can be configured to perform an approximate transformation optimization process, as further detailed herein, inter alia with respect to FIG. 4.

Objects identification and localization module 270 can be configured to determine a coordinate of an object in the mobile device's 200 local coordinate system, as further detailed herein, with reference to FIGS. 3 and 4.

Attention is drawn to FIG. 3, a flowchart illustrating one example of a sequence of operations carried out for determining an approximate transformation between a coordinate system of a device and a different coordinate system of another device, in accordance with the presently disclosed subject matter.

According to certain examples of the presently disclosed subject matter, mobile device 200 can be configured to perform an approximate transformation determination process 300, e.g. utilizing approximate transformation determination module 240.

For this purpose, mobile device 200 can be configured to obtain an image captured by an image acquisition device 210 thereof (block 310). Mobile device 200, e.g. utilizing the objects identification and localization module 270, analyzes the obtained image for identifying one or more synchronization objects within the image (block 320). The synchronization objects are later used for determining an approximate transformation between a local coordinate system of the mobile device 200 and another local coordinate system of another device, as further detailed herein.

As indicated herein, synchronization objects are objects that are visible in the image acquired by the image acquisition device 210 of the mobile device 200, and in another image acquired by another image acquisition device of another device, other than the mobile device 200, for which an approximate transformation is to be calculated, transforming the coordinates of the local coordinate system of the mobile device 200 to the local coordinate system of the other device.

In order to match between the synchronization objects identified by the mobile device 200 at block 320, and the synchronization objects identified by the other device, mobile device 200 can further obtain one or more parameters relating to one or more of the synchronization objects. The parameters can be obtained by the mobile device 200 via its network interface 260, following transmittal of the parameters by another device that can send them specifically to the mobile device 200, or multicast them in a manner that enables multiple devices, including the mobile device 200, to receive them. The parameters can be used by the mobile device 200 for the matching between the objects visible in the image acquired by the image acquisition device 210 of the mobile device 200, and in another image acquired by another image acquisition device of another device.

The parameters can include one or more of the following non-limiting exemplary parameters:

a. an orientation of the corresponding synchronization object, e.g. its pitch and/or roll and/or yaw angles;
b. a position of the corresponding synchronization object in the mobile device local coordinate system;
c. a pose of the corresponding synchronization object, e.g. whether a person that is identified as a synchronization object is sitting, standing, lifts hands, crosses legs, etc.;
d. a scale or size of the corresponding synchronization object;
e. a semantic label of the corresponding synchronization object, that can be indicative of its type, such as a human, a screen, a window, a picture, a chair, a dog, a piece of paper, or any other type of semantic labeling of any type of object);
f. a shape of the corresponding synchronization object (e.g. a rectangle, a circle, a triangle, a cone, a pyramid, a polygon, etc.);
g. a texture sample of the corresponding synchronization object ("e.g., an image of the object's surface, representing a recurring pattern, or a distinct image from the object's surface, etc.");
h. a material of the corresponding synchronization object (e.g. is it fur, wood grain, sand, smooth surface of canvas or metal, glass, leather, etc.); and
i. a statistical description of the corresponding synchronization object's one or more parameters (e.g., an estimation of the distribution of the object's size or visible colors; an estimation of the object's surface irradiance properties (e.g., reflection, refraction, diffraction and scattering)).

It is to be noted that the more parameters are provided about any synchronization object identified by the mobile device 200, the higher the likelihood that it will be matched correctly to a corresponding synchronization object identified by another device.

In some cases, in order to identify the synchronization object, at least one of the synchronization objects can be semantically labeled (e.g. it can be associated with a textual tag, visible in the image acquired by the image acquisition device 210 of the mobile device 200. It is to be noted that in some cases, the synchronization object can be another mobile device.

Returning to block 320, in some cases, at least one of the synchronization objects is a person. A person can be identified using face detection techniques that enable determining presence of faces within the image acquired by the mobile device 200, and by obtaining information of a first angle of the identified person with respect to north and a second angle of the mobile device 200 with respect to north. The information of a first angle of the identified person with respect to north can be obtained from another device associated with the person (e.g. another device 200 that the person is holding, optionally while the other device is directed at the mobile device 200). The information of the second angle of the mobile device 200 with respect to north can be obtained from the mobile device 200 itself, e.g. from a magnetometer comprised therein. Having the information about the locations of the synchronization objects that are identified by face detection, and the information about the first and second angles, enables matching between the location of the person identified using the face detection on the local coordinate system of the mobile device 200 and the location of that person on a local coordinate system of the other device associated with such person. In some cases, in order for a match to be made, the sum of the first angle and the second angle is required to be between 160° and 200°, in more specific cases it is required to be between 170° and 190°, and in more specific cases, it is required to be 180°.

In some cases, at least one of the synchronization objects is a uniquely identified object. While the matching of synchronization objects disclosed above is non-unique, and may have a certain degree of false matchings, in some cases, various methods and/or techniques may be used for enabling a unique identification of an object that can be used as a synchronization object. Some examples of such unique identification methods and/or techniques include using a Quick Response (QR) code, or any other barcode for that matter, that is associated (e.g. placed on, forms part of, etc.)

with the synchronization object. Additionally, or alternatively, a pre-determined marker, or a dynamically created marker can be used, e.g. a dynamically created marker that is shared between the mobile device 200 and other devices (e.g. a dynamically created marker, that the mobile device 200 and the other devices having a local coordinate system to which its local coordinate system is to be transformed, share knowledge that enables identification thereof). Additionally, or alternatively, a light emitting diode can be used, emitting light in a visible spectrum or in a non-visible spectrum that can be identified by the mobile device 200. Additionally, or alternatively, biometrical identification methods and/or techniques can be used to specifically and uniquely identify a person, e.g. using face recognition.

Returning to the approximate transformation determination process 300, mobile device 200 determines the spatial dispositions of the synchronization objects with respect to a first coordinate-system origin of the first coordinate-system, the first coordinate system being a coordinate system of the mobile device 200 (block 330). It is to be noted that in some cases, the spatial dispositions of the synchronization objects with respect to a first coordinate-system origin of the first coordinate-system are estimated, using various known and/or proprietary methods and techniques, including, for example Apple Inc.'s ARKit. In some cases, in order to determine the first spatial dispositions, mobile device 200 can further utilize information of the direction of the mobile device 200 with respect to the ground and north (that can be obtained from the mobile device 200 itself, e.g. from a magnetometer and an accelerometer comprised therein).

In some cases, at least one of the synchronization objects is a person and the spatial disposition thereof (with respect to a first coordinate-system origin of the first coordinate-system) is determined also using a calculated distance between pupils of the person in the image and a predetermined reference distance. The reference distance can be one of the following:
 a. an average distance between human pupils;
 b. an average distance between female human pupils when the person is a female;
 c. an average distance between male human pupils when the person is a male;
 d. an average distance between pupils of humans of a certain age group when the person is identified as being within the certain age group; and
 e. a distance between the pupils of the person.

It is to be noted that in some cases, the distance between pupils of a given person can be learned over time during which it is approximated using information obtained by other mobile devices that identified the person. Such information can later be used for identifying the person more accurately.

Returning to the approximate transformation determination process 300, mobile device 200 further obtains information of second spatial dispositions of the synchronization objects with respect to a second coordinate-system origin of the second coordinate system (block 340). In some cases, the second coordinate system is a coordinate system of a second device, other than the mobile device 200, that can optionally also be mobile.

The information of the second spatial dispositions can be obtained by the mobile device 200 via its network interface 260, following transmittal of the information by another device (the device having the local coordinate system that the approximate transformation transforms the local coordinate system of the mobile device 200 to) that can send them specifically to the mobile device 200, or multicast them in a manner that enables multiple devices, including the mobile device 200, to receive them.

Using the first spatial dispositions determined at block 330, and the second spatial dispositions obtained at block 340, mobile device 200 determines, by employing an optimization scheme, the approximate transformation between the first coordinate-system and the second coordinate-system. The approximate transformation can then be used by the mobile device 200 for placing virtual objects with respect to the second coordinate-system (block 350).

In some cases, the optimization scheme can be based on one or more of the following:
 a. Non-linear regression;
 b. Non-linear Least Squares Optimization;
 c. Non-linear programming;
 d. Bayesian estimation; and
 e. Linear quadratic estimation.

In some cases, the optimization scheme can operate under certain constraints, such as execution time, number of calculation cycles, etc., so that the processing will not have a negative effect on the user experience.

It is to be noted that, with reference to FIG. 3, some of the blocks can be integrated into a consolidated block or can be broken down to a few blocks and/or other blocks may be added. Furthermore, in some cases, the blocks can be performed in a different order than described herein (for example, blocks 310-330 can be performed before block 340, etc.). It is to be further noted that some of the blocks are optional. It should be also noted that whilst the flow diagram is described also with reference to the system elements that realizes them, this is by no means binding, and the blocks can be performed by elements other than those described herein.

Having described FIG. 3, it can be appreciated that it refers to a process of determining an initial transformation approximate transformation between a coordinate system of a device and a different coordinate system of another device. However, in some cases, the approximate transformation may be inaccurate. Therefore, it may be desirable to optimize it, over time. FIG. 4 is a flowchart illustrating one example of a sequence of operations carried out for optimizing, over time, an approximate transformation between a coordinate system of a device and a different coordinate system of another device, in accordance with the presently disclosed subject matter.

According to certain examples of the presently disclosed subject matter, mobile device 200 can be configured to perform an approximate transformation optimization process 400, e.g. utilizing approximate transformation optimization module 250.

For this purpose, mobile device 200 can be configured to obtain, over time, a sequence of subsequent images, captured by the image acquisition device 210 thereof subsequently to the image captured at block 310 of the approximate transformation determination process 300 (block 410).

Mobile device 200 is further configured to perform the following blocks 420-450, for each subsequent image of the sequence of subsequent images (block 415):
 a. Identify, by analyzing the subsequent image, one or more subsequent synchronization objects within the subsequent image, similarly to the identification of the synchronization object described with respect to block 320 of the approximate transformation determination process 300 (block 420). It is to be noted that in some cases, at least one of the subsequent synchronization objects corresponds to at least one of the synchronization objects identified at block 320.

b. Determine, by analyzing the subsequent image, third spatial dispositions of the synchronization objects with respect to the first coordinate-system origin (block 430), similarly to the determination of the first spatial dispositions of the synchronization object described with respect to block 330 of the approximate transformation determination process 300.

c. Obtain an indication of fourth spatial dispositions of the subsequent synchronization objects with respect to the second coordinate-system origin, similarly to the obtainment of the second spatial dispositions of the synchronization object described with respect to block 330 of the approximate transformation determination process 300 (block 440).

d. Determine an optimized approximate transformation, by employing the optimization scheme utilizing the third spatial dispositions and the fourth spatial dispositions (block 450).

In some cases, the optimized approximate transformation can be determined by employing the optimization scheme utilizing, in addition to the third and fourth spatial dispositions, also the approximate transformation determined at block 350, or one or more parameters relating thereto. For example, the approximate transformation can include one or more parameters that are calculated, while such parameters initially get some pre-determined (and optionally arbitrary) initial values, that are optimized using the optimization scheme employed to determine the approximate transformation. In some cases, the optimized approximate transformation can be determined by starting of with the values of those parameters that were already optimized using the optimization scheme employed to determine the approximate transformation.

In some cases, the optimized approximate transformation can be determined by employing the optimization scheme utilizing, in addition to the third and fourth spatial dispositions (and optionally also the approximate transformation determined at block 350, or one or more parameters relating thereto), also the first spatial dispositions and the second spatial dispositions determined at block 330.

In some cases, the optimized approximate transformation can be determined by employing the optimization scheme utilizing also any previously determined third and/or fourth spatial disposition determined at any previous run of block 415 for any preceding image. In more specific cases, the optimized approximate transformation is determined by employing the optimization scheme utilizing also the third spatial dispositions determined for all of the subsequent images within the sequence of subsequent images and the fourth spatial dispositions obtained for all of the subsequent images within the sequence of subsequent images.

In other cases, the optimized approximate transformation is determined by employing the optimization scheme utilizing also the third spatial dispositions determined for a subset of the subsequent images within the sequence of subsequent images and the fourth spatial dispositions obtained for the subset of the subsequent images within the sequence of subsequent images. In such cases, the subset can include the subsequent images acquired during a given time window, that can optionally be a sliding time window. For example, the subset of the subsequent images can include only those images that were acquired during a sliding time window of a couple of seconds/minutes/hours or any other pre-determined time window. In some cases, additionally or alternatively to using a sliding time window, the subset of the subsequent images can include only those images that were acquired in a given geographical location (e.g. only images acquired in a certain room or any other pre-defined geographical location). In those cases, where the subset of the subsequent images includes images that were acquired in a given geographical location, the given geographical location can dynamically change in accordance with a geographical location of the mobile device 200. For example, if the mobile device 200 moves from a first room to a second room, when the mobile device 200 moves to the second room, the subset of the subsequent images can include images that were acquired at the second room only.

It is to be noted that, with reference to FIG. 4, some of the blocks can be integrated into a consolidated block or can be broken down to a few blocks and/or other blocks may be added. Furthermore, in some cases, the blocks can be performed in a different order than described herein (for example, block 440 can be performed before blocks 420 and 430, etc.). It is to be further noted that some of the blocks are optional. It should be also noted that whilst the flow diagram is described also with reference to the system elements that realizes them, this is by no means binding, and the blocks can be performed by elements other than those described herein.

FIG. 5 is a flowchart illustrating one example of a sequence of operations carried out for placing an object having coordinates in a first coordinate system on corresponding coordinates in a second coordinate system, in accordance with the presently disclosed subject matter.

According to certain examples of the presently disclosed subject matter, mobile device 200 can be configured to perform an object placement process 500, e.g. utilizing object placement module 280.

For this purpose, mobile device 200 can be configured to obtain information of an object for placement and coordinates of the object for placement in a second coordinate system other than the coordinate system of the mobile device 200 (block 510).

Mobile device 200 further obtains an approximate transformation (whether it be an approximate transformation determined in accordance with the approximate transformation determination process 300 or an optimized approximate transformation determined in accordance with the approximate transformation optimization process 400) between the coordinate-system of the mobile device 200 and the second coordinate-system (block 520).

Mobile device 200 transforms the coordinates of the object for placement in the second coordinate system to the corresponding coordinates in the first coordinate system according to the approximate transformation obtained at block 520 (block 530) and places the object for placement in the transformed coordinates in the first coordinate system (block 540).

It is to be noted that, with reference to FIG. 5, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for determining an approximate transformation between a first coordinate system and a second coordinate system, the system comprising a processing resource configured to:
   obtain an image captured by an image acquisition device of a mobile device;
   identify, by analyzing the image, one or more synchronization objects within the image;
   determine first spatial dispositions of the synchronization objects with respect to a first coordinate-system origin of the first coordinate-system, the first coordinate system being a coordinate system of the mobile device;
   obtain information of second spatial dispositions of the synchronization objects with respect to a second coordinate-system origin of the second coordinate system; and
   determine, by employing an optimization scheme, utilizing the first spatial dispositions and the second spatial dispositions, the approximate transformation between the first coordinate-system and the second coordinate-system, the approximate transformation being usable by the mobile device for placing virtual objects with respect to the second coordinate-system.

2. The system of claim 1, wherein the processing resource is further configured to:
   obtain, over time, a sequence of subsequent images, captured subsequently to the image;
   for each subsequent image of the sequence:
      identify, by analyzing the subsequent image, one or more subsequent synchronization objects within the subsequent image;
      determine, by analyzing the subsequent image, third spatial dispositions of the synchronization objects with respect to the first coordinate-system origin;
      obtain information of fourth spatial dispositions of the subsequent synchronization objects with respect to the second coordinate-system origin; and
      determine an optimized approximate transformation, by employing the optimization scheme utilizing the third spatial dispositions and the fourth spatial dispositions.

3. The system of claim 2, wherein the optimized approximate transformation is determined by employing the optimization scheme utilizing also the approximate transformation.

4. The system of claim 2, wherein the optimized approximate transformation is determined by employing the optimization scheme utilizing also the first spatial dispositions and the second spatial dispositions.

5. The system of claim 2, wherein the optimized approximate transformation is determined by employing the optimization scheme utilizing the third spatial dispositions determined for all of the subsequent images within the sequence of subsequent images and the fourth spatial dispositions obtained for all of the subsequent images within the sequence of subsequent images.

6. The system of claim 2, wherein the optimized approximate transformation is determined by employing the optimization scheme utilizing the third spatial dispositions determined for a subset of the subsequent images within the sequence of subsequent images and the fourth spatial dispositions obtained for the subset of the subsequent images within the sequence of subsequent images.

7. The system of claim 1, wherein the optimization scheme is based on one or more of the following:
   a. Non-linear regression;
   b. Non-linear Least Squares Optimization;
   c. Non-linear programming;
   d. Bayesian estimation; and
   e. Linear quadratic estimation.

8. The system of claim 1, wherein the processing resource is further configured to obtain one or more parameters relating to one or more of the synchronization objects, and wherein the synchronization objects are identified using the corresponding parameters.

9. The system of claim 8, wherein the parameters include one or more of the following:
   a. an orientation of the corresponding synchronization object;
   b. a pose of the corresponding synchronization object;
   c. a scale or size of the corresponding synchronization object;
   d. a semantic label of the corresponding synchronization object;
   e. a shape of the corresponding synchronization object;
   f. a texture sample of the corresponding synchronization object; and
   g. a statistical description of the corresponding synchronization object's one or more parameters.

10. The system of claim 1, wherein the second coordinate system is a coordinate system of a second mobile device, other than the mobile device.

11. A method for determining an approximate transformation between a first coordinate system and a second coordinate system, the method comprising:
   obtaining, by a processing resource, an image captured by an image acquisition device of a mobile device;
   identifying, by the processing resource and by analyzing the image, one or more synchronization objects within the image;
   determining, by the processing resource, first spatial dispositions of the synchronization objects with respect to a first coordinate-system origin of the first coordinate-system, the first coordinate system being a coordinate system of the mobile device;
   obtaining, by the processing resource, information of second spatial dispositions of the synchronization objects with respect to a second coordinate-system origin of the second coordinate system; and
   determining, by the processing resource and by employing an optimization scheme, utilizing the first spatial dispositions and the second spatial dispositions, the approximate transformation between the first coordinate-system and the second coordinate-system, the approximate transformation being usable by the mobile device for placing virtual objects with respect to the second coordinate-system.

12. The method of claim 11, further comprising:
obtaining, by the processing resource, over time, a sequence of subsequent images, captured subsequently to the image;
for each subsequent image of the sequence:
- identifying, by the processing resource and by analyzing the subsequent image, one or more subsequent synchronization objects within the subsequent image;
- determining, by the processing resource and by analyzing the subsequent image, third spatial dispositions of the synchronization objects with respect to the first coordinate-system origin;
- obtaining, by the processing resource, information of fourth spatial dispositions of the subsequent synchronization objects with respect to the second coordinate-system origin; and
- determining, by the processing resource, an optimized approximate transformation, by employing the optimization scheme utilizing the third spatial dispositions and the fourth spatial dispositions.

13. The method of claim 12, wherein the optimized approximate transformation is determined by employing the optimization scheme utilizing also the approximate transformation.

14. The method of claim 12, wherein the optimized approximate transformation is determined by employing the optimization scheme utilizing also the first spatial dispositions and the second spatial dispositions.

15. The method of claim 12, wherein the optimized approximate transformation is determined by employing the optimization scheme utilizing the third spatial dispositions determined for all of the subsequent images within the sequence of subsequent images and the fourth spatial dispositions obtained for all of the subsequent images within the sequence of subsequent images.

16. The method of claim 12, wherein the optimized approximate transformation is determined by employing the optimization scheme utilizing the third spatial dispositions determined for a subset of the subsequent images within the sequence of subsequent images and the fourth spatial dispositions obtained for the subset of the subsequent images within the sequence of subsequent images.

17. The method of claim 12, wherein the optimization scheme is based on one or more of the following:
a. Non-linear regression;
b. Non-linear Least Squares Optimization;
c. Non-linear programming;
d. Bayesian estimation; and
e. Linear quadratic estimation.

18. The method of claim 11, further comprising obtaining, by the processing resource, one or more parameters relating to one or more of the synchronization objects, and wherein the synchronization objects are identified using the corresponding parameters.

19. The method of claim 18, wherein the parameters include one or more of the following:
a. an orientation of the corresponding synchronization object;
b. a pose of the corresponding synchronization object;
c. a scale or size of the corresponding synchronization object;
d. a semantic label of the corresponding synchronization object;
e. a shape of the corresponding synchronization object;
f. a texture sample of the corresponding synchronization object; and
g. a statistical description of the corresponding synchronization object's one or more parameters.

20. A non-transitory computer readable storage medium having computer readable program code embodied therewith, the computer readable program code, executable by at least one processor of a computer to perform a method for determining an approximate transformation between a first coordinate system and a second coordinate system, the method comprising:
- obtaining, by the processor, an image captured by an image acquisition device of a mobile device;
- identifying, by the processor and by analyzing the image, one or more synchronization objects within the image;
- determining, by the processor, first spatial dispositions of the synchronization objects with respect to a first coordinate-system origin of the first coordinate-system, the first coordinate system being a coordinate system of the mobile device;
- obtaining, by the processor, information of second spatial dispositions of the synchronization objects with respect to a second coordinate-system origin of the second coordinate system; and
- determining, by the processor and by employing an optimization scheme, utilizing the first spatial dispositions and the second spatial dispositions, the approximate transformation between the first coordinate-system and the second coordinate-system, the approximate transformation being usable by the mobile device for placing virtual objects with respect to the second coordinate-system.

* * * * *